Patented Nov. 9, 1937

2,098,782

UNITED STATES PATENT OFFICE 2,098,782

AZO DYESTUFFS

Heinrich Hopff and August Weickmann, Ludwigshafen-on-the-Rhine, Germany, assignors to General Aniline Works, Inc., New York, N. Y., a corporation of Delaware No Drawing. Application December 18, 1935, Serial No. 55,042. In Germany December 20, 1934

4 Claims. (Cl. 260—77)

The present invention relates to the manufacture and production of azo dyestuffs.

We have found that azo dyestuffs which are eminently suitable for dyeing cellulose esters and ethers can be obtained by coupling condensation products prepared by condensing aromatic or heterocyclic compounds containing at least one reactive hydrogen atom, which compounds are free from sulphonic acid groups, with butylene-1,2,3,4-dioxides with diazotized aromatic amines which are free from sulphonic acid groups or by diazotizing condensation products of the said kind, which contain free amino groups and coupling the diazo compounds thus obtained with coupling components, which are free from sulphonic acid groups.

Condensation products of the first kind may be coupled with diazo compounds in substance or on the fibre. For example the azo dyestuff prepared by coupling with diazotized paranitriline, 1,4-dianilidobutane-2,3-diol (obtainable by condensing 1 molecular proportion of butylene-1,2,3,4-dioxide with 2 molecular proportions of aniline under a strong evolution of heat) dyes acetate artificial silk a reddish yellow shade. If 1,4-dimeta-toluido-butane-2,3-diol (obtained by condensing 1 molecular proportion of butylene-1,2,3,4-dioxide with 2 molecular proportions of meta-toluidine under a strong evolution of heat) is coupled with diazotized para-nitraniline, an azo dyestuff is obtained which yields beautiful golden yellow dyeings. The coupling process may also be carried out on the fibre. For example the condensation product of butylene-1,2,3,4-dioxides and aromatic amines go onto acetate artificial silk very well from aqueous solution or suspension; they may then be converted into dyestuffs by bringing the material thus treated into solutions of diazo compounds.

Condensation products of butylene-1,2,3,4-dioxides with secondary amines may also be employed as coupling components. As suitable amines of this kind may be mentioned for example methyl-aniline, ethyl-aniline, normal-butyl-aniline, cyclohexyl-aniline, benzyl-aniline and diphenyl-amine.

On the other hand condensation products of butylene-1,2,3,4-dioxides with aromatic or heterocyclic compounds containing at least one reactive hydrogen atom and which are free from sulphonic acid groups may be employed as diazo components. Thus for example 1,4-di-(4-nitro-anilido)-butane-2,3-diol (obtainable by condensation of 1 molecular proportion of butylene-1,2,3,4-dioxide with 2 molecular proportions of para-nitraniline) can be reduced to 1,4-dipara-phenylenediamido-butane-2,3-diol. This compound is diazotized in the usual manner and the tetrazo compound thus obtained coupled with a coupling component free from sulphonic acid groups, as for example beta-naphthol.

The following examples will further illustrate how the said invention may be carried out in practice, but the invention is not restricted to these examples. The parts are by weight.

Example 1

272 parts of 1,4-dianilidobutane-2,3-diol (obtainable by condensing 2 molecular proportions of aniline with 1 molecular proportion of butylene-1,2,3,4-dioxide) are dissolved in dilute hydrochloric acid and coupled with a solution of the diazo compound of 138 parts of para-nitraniline. A yellow brown product is obtained which dyes acetate artificial silk brilliant yellow shades.

A similar dyestuff giving on acetate artificial silk more golden yellow shades is obtained by employing 1,4-dimeta-toluido butane-2,3-diol instead of 1,4-dianilido-butane-2,3-diol.

Example 2

386 parts of 1,4-di-(4-acetamino-anilido)-butane-2,3-diol corresponding to the formula

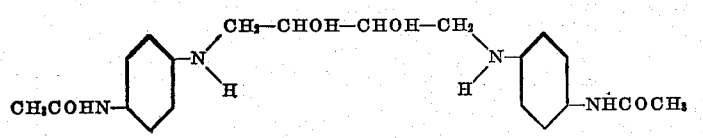

(obtainable by condensing 1 molecular proportion of butylene-1,2,3,4-dioxide with 2 molecular proportions of 1-amino-4-acetamino-benzene) are saponified with a 10 per cent alcoholic solution of sodium hydroxide. The 1,4-di-(4-aminoanilido)-butane-2,3-diol is diazotized in the usual manner and the diazo solution is coupled with the alkaline solution of 290 parts of beta-naphthol. A dyestuff is formed which dyes acetate artificial silk bluish red shades.

What we claim is:

1. Azo dyestuffs corresponding to the general formula:

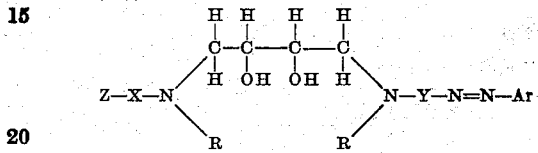

in which the R's stand for members of the group consisting of hydrogen and alkyl, cycloalkyl, aralkyl and aryl radicals free from sulfonic acid groups, X and Y stand for radicals of the benzene series free from sulfonic acid groups, Ar stands for an aryl radical free from sulfonic acid groups, and Z stands for a member of the group consisting of hydrogen and the group —N=N—Ar.

2. The azo dyestuff of the formula

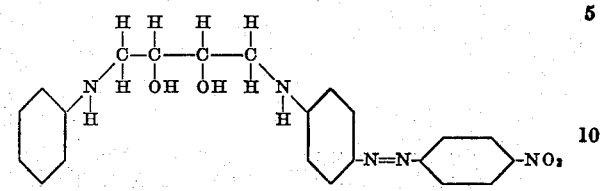

3. The azo dyestuff of the formula

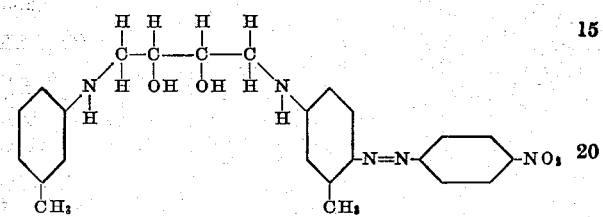

4. The azo dyestuff of the formula

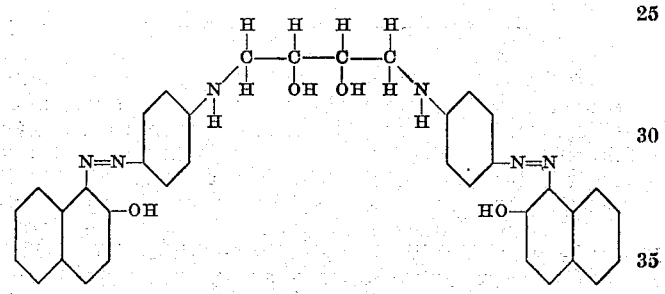

HEINRICH HOPFF.
AUGUST WEICKMANN.